United States Patent
Ricard et al.

(10) Patent No.: US 11,480,235 B2
(45) Date of Patent: Oct. 25, 2022

(54) ACTUATOR LOWER ATTACHMENT

(71) Applicant: GOODRICH ACTUATION SYSTEMS SAS, Saint-Ouen-l'Aumône (FR)

(72) Inventors: Quentin Ricard, Eaubonne (FR); Raphael Medina, Ecouen (FR)

(73) Assignee: GOODRICH ACTUATION SYSTEMS SAS, Saint-Ouen-l'Aumône (FR)

( * ) Notice: Subject to any disclaimer, the term of this patent is extended or adjusted under 35 U.S.C. 154(b) by 434 days.

(21) Appl. No.: 16/712,328

(22) Filed: Dec. 12, 2019

(65) Prior Publication Data

US 2020/0393027 A1 Dec. 17, 2020

(30) Foreign Application Priority Data

Jun. 14, 2019 (EP) .................................... 19290040

(51) Int. Cl.
*F16H 25/20* (2006.01)
*B64C 13/28* (2006.01)
(Continued)

(52) U.S. Cl.
CPC .......... *F16H 25/205* (2013.01); *B64C 13/28* (2013.01); *F16H 25/2003* (2013.01);
(Continued)

(58) Field of Classification Search
CPC ............. F16H 25/2003; F16H 25/2454; F16H 25/2472; B64C 13/28
See application file for complete search history.

(56) References Cited

U.S. PATENT DOCUMENTS 3,304,794 A * 2/1967 Bird .......................... B66F 3/08
74/89.42
3,464,164 A * 9/1969 Blohm ................ F16H 25/2472
451/342

(Continued)

FOREIGN PATENT DOCUMENTS

| EP | 3072809 A1 | 9/2016 |
| EP | 3282146 A1 | 2/2018 |
| WO | 2011096913 A1 | 8/2011 |

OTHER PUBLICATIONS

Extended European Search Report dated Dec. 13, 2019 for corresponding European Patent Application No. 19290040.5; (9 pgs).

*Primary Examiner* — Terence Boes
(74) *Attorney, Agent, or Firm* — Cantor Colburn LLP (57) ABSTRACT

A screw actuator having a screw shaft and a nut arrangement is described herein, the nut arrangement comprising: a primary nut; a first secondary nut having a first thread; a second secondary nut having a second thread; and a first attachment means. The first nut, first secondary nut, and second secondary nut are connected to the first attachment means with a first, initial, axial spacing between the first and second secondary nuts. The first secondary nut is mounted to the first attachment means via bearings that allow the first secondary nut to rotate relative to the first attachment. The first secondary nut is connected to the second secondary nut via a screw thread connection having a pitch lower than a pitch of a screw thread of the screw actuator shaft.

6 Claims, 6 Drawing Sheets

(51) Int. Cl.
*F16H 25/22* (2006.01)
*F16H 25/24* (2006.01)

(52) U.S. Cl.
CPC ..... *F16H 25/2209* (2013.01); *F16H 25/2454* (2013.01); *F16H 25/2472* (2013.01); *F16H 25/2015* (2013.01); *F16H 2025/2037* (2013.01)

(56) References Cited

U.S. PATENT DOCUMENTS

| | | | | |
|---|---|---|---|---|
| 3,857,547 | A * | 12/1974 | Profet | F16H 25/006 74/89.42 |
| 8,033,500 | B1 * | 10/2011 | Charafeddine | B64C 9/02 244/99.2 |
| 8,291,782 | B1 * | 10/2012 | Shaheen | B64C 9/02 74/89.34 |
| 8,496,204 | B1 * | 7/2013 | Charafeddine | B64C 13/505 244/99.4 |
| 10,239,603 | B2 | 3/2019 | Medina et al. | |
| 2018/0072403 | A1 * | 3/2018 | Vermande | F16H 25/2021 |
| 2019/0107185 | A1 | 4/2019 | Medina et al. | |

* cited by examiner

ACTUATOR LOWER ATTACHMENT

FOREIGN PRIORITY

This application claims priority to European Patent Application No. 19290040.5 filed Jun. 14, 2019, the entire contents of which is incorporated herein by reference.

TECHNICAL FIELD

The present disclosure relates to a lower attachment for an actuator and a method of attaching an actuator to another component, such as an aircraft stabilizer.

BACKGROUND

Actuators are commonly used devices for moving one part of a mechanical system relative to another part. For example, actuators are used extensively throughout aircraft to, move flaps and slats relative to the frame of the aircraft, to control the aircraft during flight. One safety-critical actuator is a trimmable horizontal stabilizer actuator (THSA) that controls the trimmable horizontal stabilizer (THS) on an aircraft. Screw actuators are commonly used for a THSA arrangement. The actuator needs to be connected to the frame of the aircraft, at one end, and to the THS at the other end. The connection to the aircraft frame is commonly called the upper attachment, and the connection to the THS is commonly called the lower attachment. Typically, a screw actuator will have a drive portion (e.g. a motor) connected to the frame by the upper attachment, and the drive portion drives rotation of a screw shaft. A nut (which may comprise a plurality of nuts, for redundancy) is disposed on the screw shaft and is held against rotation. This means that rotation of the screw shaft causes the nut to translate along the shaft. The nut is connected to (or part of) the lower attachment that connects to the THS.

As the THSA is a safety-critical part of an aircraft, it is known in the art to provide redundancy in the actuator arrangement such that if a primary load path (PLP) fails, a secondary load path (SLP) may be engaged so that the THS does not move uncontrollably during flight. At the lower attachment, this is often provided by a primary nut that provides the PLP and a secondary nut that is connected to the primary nut. The secondary nut provides the SLP and is held relative to the primary nut such that it does not experience loading (and thus does not experience wear/fatigue) while the PLP is engaged. Often the parts forming the secondary load path are designed to jam the actuator when the SLP is engaged (e.g. when the PLP fails, due to wear, fatigue, etc.). This ensures that the THS does not flap about uncontrollably when the PLP fails.

If the THS flutters too much during flight (i.e. under aerodynamic loading), this can cause shock loading to other parts of the aircraft and THSA, sometimes even to the extent of the THS breaking free from the aircraft. Therefore, it is a certification requirement that the angle of the THS should not flutter beyond an angular range of 0.034°, regardless of whether the PLP or the SLP is engaged. That is, the THS must be held quite securely by the THSA such that the aerodynamic loads on the THS do not cause it to move by more than 0.034°.

When the PLP is engaged, it is known in the art how to meet this 0.034° certification requirement by determining the necessary resilience of the THSA components under aerodynamic loading, the thermal expansion of various components under expected operating conditions, and controlling the cumulative amount of backlash in the THSA system. That is, the designer will combine together the total amounts by which components can deform under expected THS aerodynamic loads, and add the backlash due to thermal expansion, and add the backlash between the primary nut and the screw shaft, and come up with a cumulative backlash value that translates into a maximum flutter, measured in degrees, for the THS.

As above, the SLP must be kept unloaded while the PLP is engaged, so as to avoid wear/fatigue in the SLP. To keep the SLP unloaded during the expected deformation/thermal expansion etc. in the PLP, backlash is introduced to sufficiently space apart the SLP components so that they do not experience loading while the PLP is engaged. This introduces further backlash in the system and, when the SLP is engaged, this further backlash can lead to the 0.034° certification requirement not being met.

In one known example for the lower attachment, the secondary nut has a thinner thread than the primary nut and is held by the primary nut such that the thread of the secondary nut does not touch the thread of the screw shaft while the PLP is engaged. As a result, there is generally significant backlash in the THSA when the SLP is engaged. This backlash is necessary so that the SLP does not experience wear/fatigue while the PLP is engaged, but this also means that the backlash when the SLP is engaged can exceed the aforesaid 0.034° certification requirement. Therefore, it is desirable to provide a backlash reduction system in the THSA such that an initial amount of backlash that is present in the SLP while the SLP is not engaged is reduced when the SLP is engaged.

US 2019/0107185 A1 discloses a known lower attachment system for a THSA that, when a primary nut fails, causes two secondary nuts to move apart from/towards one another so as to cancel the initially-existing backlash between the threads of the secondary nuts and the thread of the screw shaft.

In one known example for the upper attachment, a tie bar is provided. The tie bar extends down the centre of the actuator's screw shaft and rotates with the screw shaft. The tie bar has a ball-shaped end that is held in a yoke that is connected to the aircraft frame. The yoke substantially encloses the ball-shaped end of the tie bar such that, when the bar is moved under load, e.g. when the SLP is engaged, the tie bar cannot move axially out of the yoke. While the PLP is engaged, the ball-shaped end rotates within, and relative to, the yoke and there is space (backlash) between the ball and yoke so that there is no wear on the ball-shaped end. When the SLP is engaged (e.g. if another portion of the upper attachment fails, such as a gimbal), the tie bar loads against the yoke in compression and/or extension (depending on the direction of aerodynamic loading on the THS). Due to the initial backlash required to space the ball-shaped end of the tie bar from the yoke, there is further backlash in the overall THSA system when the SLP at the upper-end engages. Again, this can lead to the aforesaid 0.034° certification requirement being exceeded when the SLP is engaged.

U.S. Pat. No. 10,239,603 discloses one solution to reduce the backlash at the upper end when the SLP is engaged. This document discloses an upper attachment system for a THSA that grips the end of a tie bar when the SLP is engaged, so as to reduce backlash, by screwing an inner yoke of a two-part yoke towards the top of the tie bar.

The total initial amount of backlash in a THSA includes, inter alia, backlash at the upper attachment and the lower attachment. For the reasons described above, the backlash can increase, sometimes significantly, when the SLP is engaged at one or both of the upper and lower attachments. Thus, it is desirable to provide backlash reduction systems in a THSA that reduce the overall backlash when a SLP is engaged.

SUMMARY

According to a first aspect, the disclosure provides a screw actuator having a nut arrangement, the nut arrangement comprising: a primary nut; a first secondary nut having a thread; a second secondary nut having a thread; and a first attachment means; wherein the first nut, first secondary nut, and second secondary nut are connected to the first attachment means with a first axial spacing between the first and second secondary nuts; and wherein the first secondary nut is mounted to the first attachment means via bearings that allow the first secondary nut to rotate relative to the first attachment; and wherein the first secondary nut is connected to the second secondary nut via a screw thread connection having a pitch different from a pitch of a thread of the first secondary nut; and wherein, when any primary load path component fails, when the primary nut fails the threads of first and second secondary nut load against a screw thread of the actuator, the first secondary nut rotates relative to the second secondary nut (this one is blocked in rotation) as a result of the screw thread connection, so as to move from the first axial spacing between the first and second secondary nuts to a second, different, axial spacing between the nuts. This reduces backlash between the secondary nuts and a screw shaft of the actuator.

In any of the examples described herein, the primary nut may be a ball-screw nut and the first and second secondary nuts may be screw nuts.

In any of the examples described herein, there may be no backlash between the primary nut and the first attachment means, and there may be no backlash between the first primary nut and the first attachment means.

In any of the examples described herein, the second secondary nut may be held against rotation by the first attachment means.

In any of the examples described herein, a latch mechanism may be provided to lock the first secondary nut against further rotation after the first secondary nut has rotated a predetermined amount relative to the first attachment means.

In any of the examples described herein, the latch mechanism may comprise a hook, a ratchet, or a spring pin. In any of the examples described herein, the holding means may be provided to prevent rotation of the first secondary nut before the thread of the first secondary nut loads against the screw thread of the screw shaft.

In any of the examples described herein, the holding means may comprise a shear pin or a ball detent.

The screw actuators described herein may be used on an aircraft and the aircraft may comprise a frame and a trimmable horizontal stabilizer as well as the screw actuator described herein. The screw actuator may be connected by an upper attachment to the frame and the first attachment means may be connected to the trimmable horizontal stabilizer and the screw actuator is for controlling the orientation of the trimmable horizontal stabilizer relative to the aircraft.

A method of reducing backlash in a nut arrangement of a screw actuator is also described herein, the method comprising: mounting the nut arrangement of any preceding claim onto a screw shaft of an actuator, wherein the first and second secondary nuts have a first, initial, axial spacing; when the primary nut fails, loading the first and second secondary nuts against a thread of the screw shaft; and rotating the first secondary nut relative to the second secondary nut such that, due to the screw connection, the first and second secondary nuts move to a second, different, axial spacing.

A method of manufacturing a screw actuator having a screw shaft and a nut arrangement is also described herein. The method comprises providing the nut arrangement described above. That is, the nut arrangement comprises a primary nut; a first secondary nut having a first thread; a second secondary nut having a second thread (64); and a first attachment means. The method further comprises connecting the first nut, first secondary nut, and second secondary nut to the first attachment means with a first, initial, axial spacing between the first and second secondary nuts. The method further comprises mounting the first secondary nut to the first attachment means via bearings that allow the first secondary nut to rotate relative to the first attachment. The method further comprises connecting the first secondary nut to the second secondary nut via a screw thread connection having a pitch lower than a pitch of a screw thread of the screw actuator shaft. When the primary nut fails under load, the threads of first and second secondary nuts load against the screw thread of the screw shaft which causes the first secondary nut to rotate relative to the second secondary nut and, as a result of the screw thread connection, the first and second secondary nuts move from the first axial spacing between the first and second secondary nuts to a second, different, axial spacing between the first and second secondary nuts.

The method of manufacture may comprise providing any of the features and components as described above and herein.

BRIEF DESCRIPTION OF THE FIGURES

Certain embodiments of the present disclosure will now be described in greater detail by way of example only and with reference to the accompanying drawings in which.

DETAILED DESCRIPTION

Figure 1:
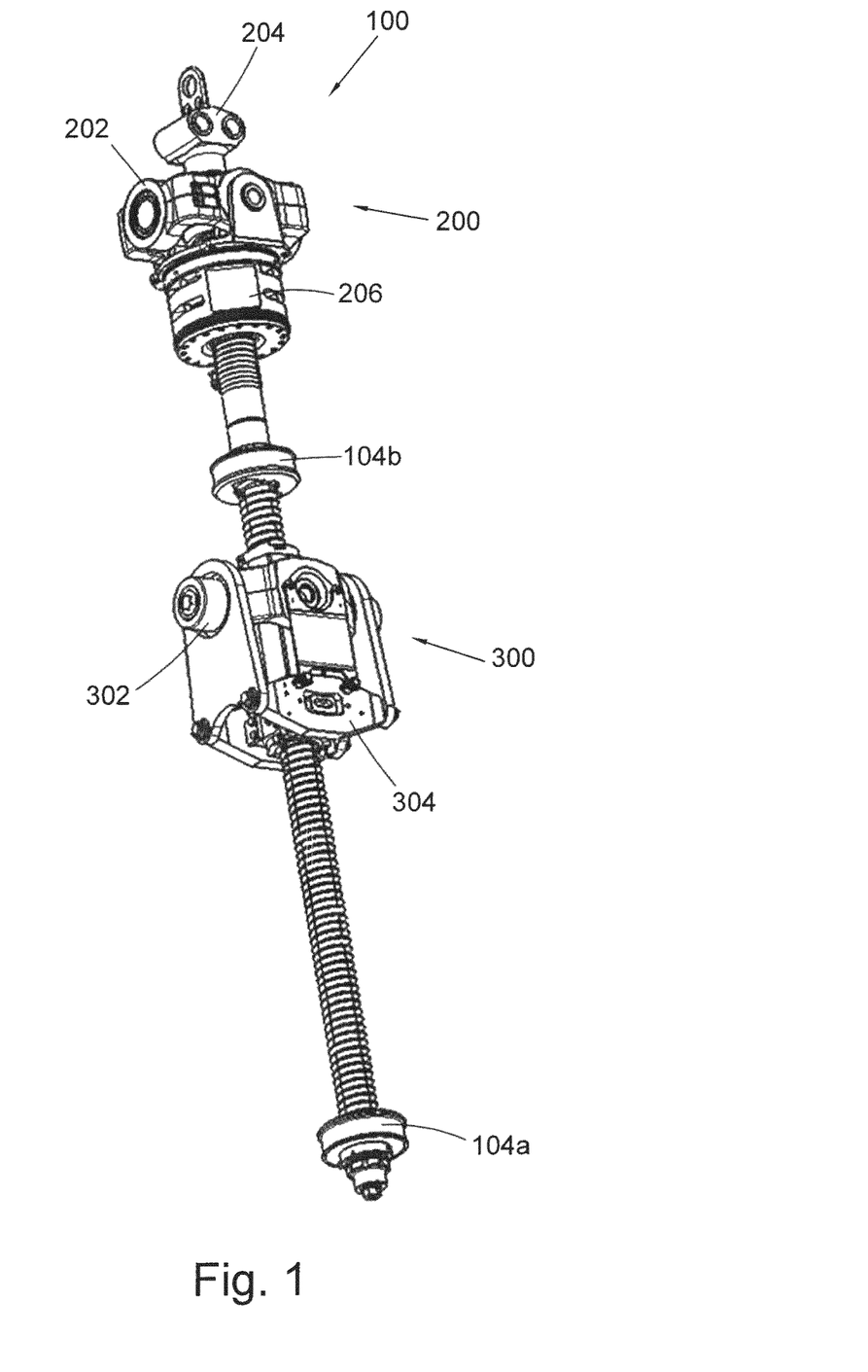
FIG. 1 shows a known actuator.

FIG. 1 shows a known actuator 100 having an upper portion 200 and a lower portion 300. For example, the actuator 100 may be a trimmable horizontal stabilizer actuator (THSA) for an aircraft. The actuator 100 has a screw shaft 102. The lower portion 300 moves along the screw shaft in response to rotation of the screw shaft 102. End stops 104*a*,140*b* are installed on the screw shaft 102 and these limit the range of axial movement of the lower portion 300 along the screw shaft 102.

The upper portion 200 has a gimbal 202 that is attachable to a frame of an aircraft (not shown) and an upper attachment 204 that is also attachable to the frame of the aircraft. During normal operating conditions, the gimbal 202 takes all of load between the actuator 100 and aircraft, i.e. it provides a primary load path. If the gimbal 202 fails, the upper attachment 204 takes all of the load between the actuator 100 and the aircraft. That is, the upper attachment 204 provides a redundant connection, i.e. secondary load path, between the actuator 100 and the aircraft, that is not loaded until the gimbal 202 (or other part) of the primary load path fails.

The lower portion 300 comprises a primary attachment 302 and a secondary attachment 304. During normal operating conditions, the primary attachment transfers load from the actuator 100 to a trimmable horizontal stabilizer (THS) (not shown). The primary attachment 302 transfers load between the THS and a primary nut of the actuator 100. The primary nut is seated on the screw shaft 102 and transfers load between the primary attachment 302 and the screw shaft 102. If the primary nut fails, a secondary nut that is connected to the secondary attachment 304 engages with the screw shaft 102. The secondary attachment 304 then transfers load between the actuator 100 and the THS. That is, the secondary attachment 304 provides a redundant connection, i.e. secondary load path, between the actuator 100 and the THS. "Normal operation" is generally defined herein as the case where load through the actuator 100 follows the primary load path.

Failure of the primary load path in the upper portion 200 is generally independent of failure of the primary load path in the lower portion 300. Thus, for example, failure of the primary nut in the lower portion, such that the secondary nut has to bear load, is independent of whether the gimbal 202 if loaded or if the upper attachment 204 is loaded at the upper portion 200.

Figure 2A:
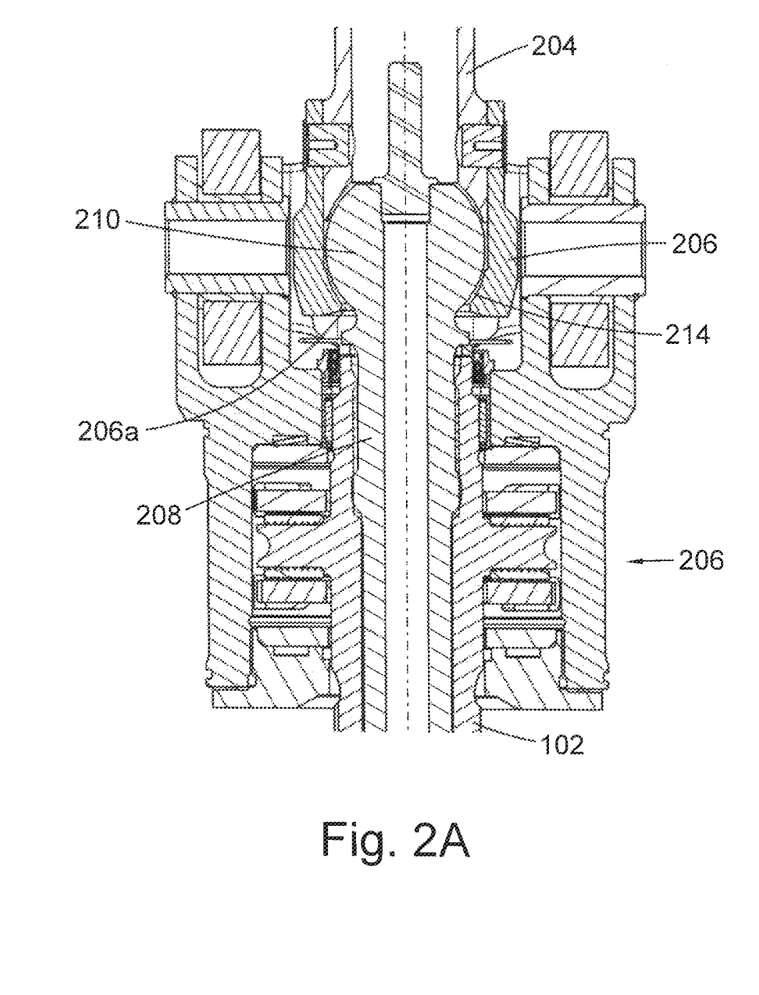
FIGS. 2A and 2B show views of a known upper attachment for attaching the known actuator to a frame, e.g. the frame of an aircraft.
Figure 2B:
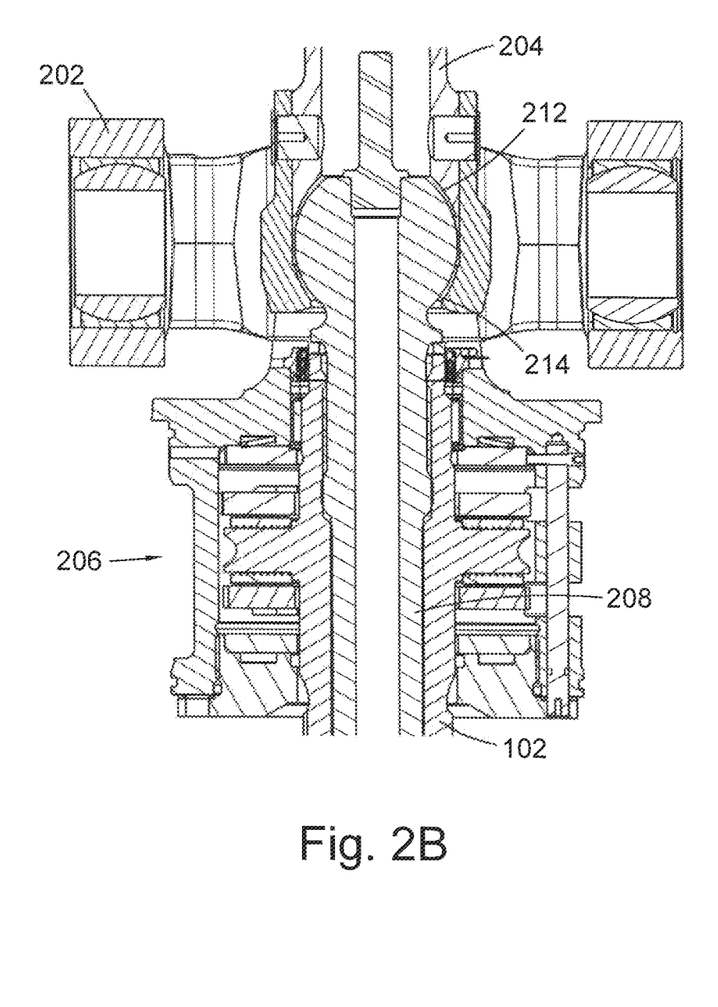

FIGS. 2A and 2B show views of the upper portion 200 from the known actuator 100 of FIG. 1. The upper portion 200 comprises the gimbal 202 and the upper attachment 204. The upper attachment 204 forms or is directly connected to a yoke 206. A tie bar 208 extends along a center of the screw shaft 102 and is connected for rotation therewith. The tie bar 208 has a ball-shaped end 210 that is housed inside the yoke 206. That is the yoke 206 defines an internal cavity 212 that is larger than the ball-shaped end. The yoke 206 has an aperture 206a that is sized such that the ball-shaped end 210 cannot move out of the yoke 206. During operation of the actuator 100, the screw shaft 102 rotates and therefore so does the tie bar 208. During operation of the actuator 100, the upper attachment 204 and yoke 206 do not rotate. To avoid wear to the yoke 206 and the ball-shaped end 210 as a result of rubbing, there is a gap 214 between the ball-shaped end 210 and the yoke 206. During normal operation, the gimbal 202 transfers all of the load from the actuator 100 to the frame of the aircraft and, as a result of this loading, the gimbal 202 may elastically deform to some extent. Further, under different operating temperatures, the gimbal 202 and other parts of the actuator 100 may thermally expand/contract. The gap 214 is sized so that, even under the aforesaid thermal/loading deformations of the gimbal 204, the ball-shaped end 201 does not contact the yoke 206.

During normal operation, the gimbal 202 provides a primary load path between the actuator 100 and the frame of the aircraft. If the gimbal 202 becomes damaged or breaks, e.g. due to wear or fatigue, then the upper attachment 204 provides a backup connection between the actuator 100 and the frame of the aircraft. That is, the upper attachment provides a secondary load path that is not engaged (loaded) during normal operation. If the gimbal 202 fails, then the (secondary) load path from the aircraft to the THSA goes: from the frame of the aircraft; into the upper attachment 204; through the yoke 206; into the ball-shaped end 210 of the tie bar 208; into the screw shaft 102; into the nut(s); into to the primary 302 or secondary attachment 304 (depending on any failure in the lower portion 300); and into the THS.

The gap 214 provides room for free movement between the ball-shaped end 210 and the yoke 206 and this region of free movement allows the THS to flutter under aerodynamic loading when the secondary load path is engaged.

Figure 3:
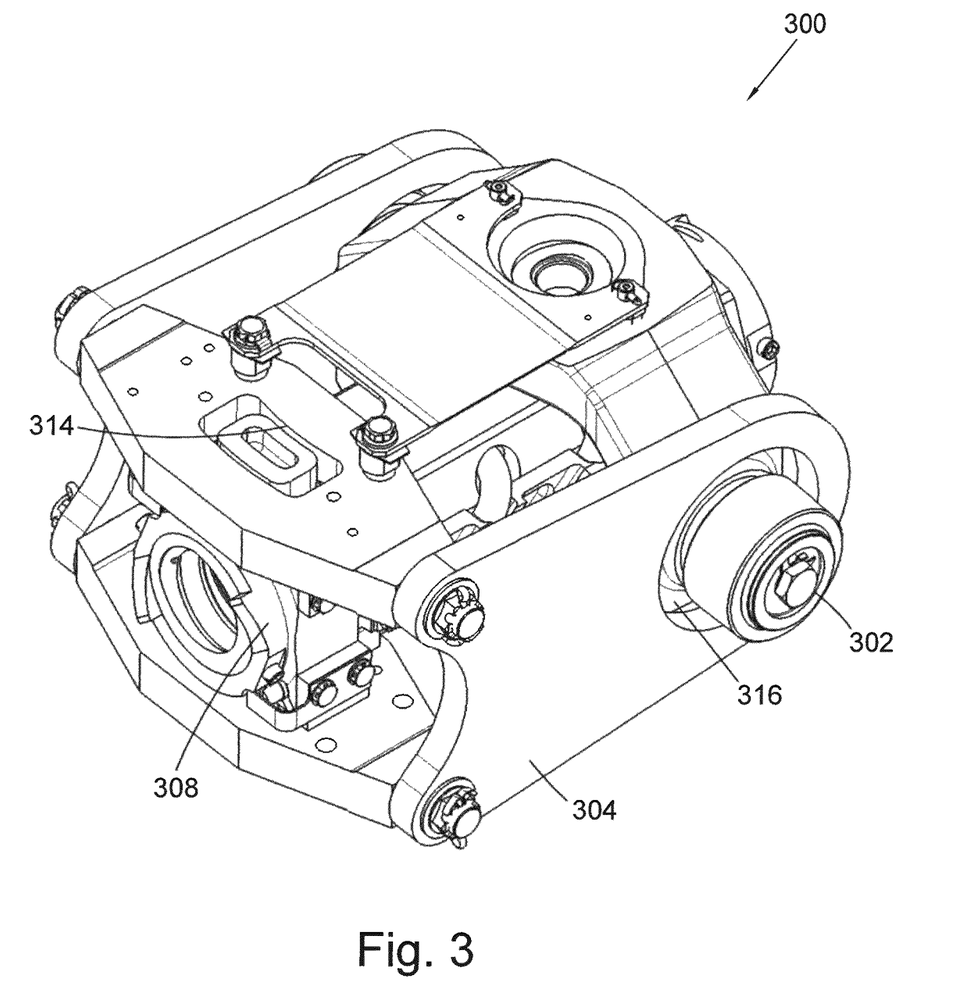
FIG. 3 shows a known nut arrangement for the actuator.

FIG. 3 shows an enlarged view of the lower portion 300 from a known actuator 100. The lower portion 300 comprises the primary attachment 302, the secondary attachment 304, a primary nut 306 and a secondary nut 308. The primary nut 306 is fixedly connected to the primary attachment 302. The secondary nut 308 is connected to the secondary attachment 304 but with backlash in the form of a gap 314. The secondary attachment 304 is connected to the primary attachment but with backlash in the form of a gap 316.

During normal operation, load from the screw shaft 102 (not shown in FIG. 3) is transferred into the primary nut 306 and thence into the primary attachment 302 which connects to the THS.

The secondary nut 308 is held in a fixed axial position relative to the primary nut 306. The secondary nut has an internal thread that has the same pitch and spacing as the thread of the screw shaft 102, but the thread is thin in the axial direction such that, when the primary nut 306 is functioning properly, the thread of the secondary nut 308 does not touch the thread of the screw shaft 102. This is to prevent wear on the secondary nut 308 during normal operation of the actuator 100. However, this thin thread leads to additional backlash in the overall actuator system when the SLP/secondary nut 308 is engaged.

If the primary nut 306 fails, e.g. due to wear or fatigue, then load from the screw shaft 102 is transferred into the secondary nut 306 and then into the secondary attachment 304 and from there into the primary attachment 302 and thence into the THS. The gaps 314,316 between the secondary attachment 304 and the secondary nut and primary attachment add further backlash to the overall actuator 100 system when the secondary load path in the lower portion 300 is engaged.

Figure 4:
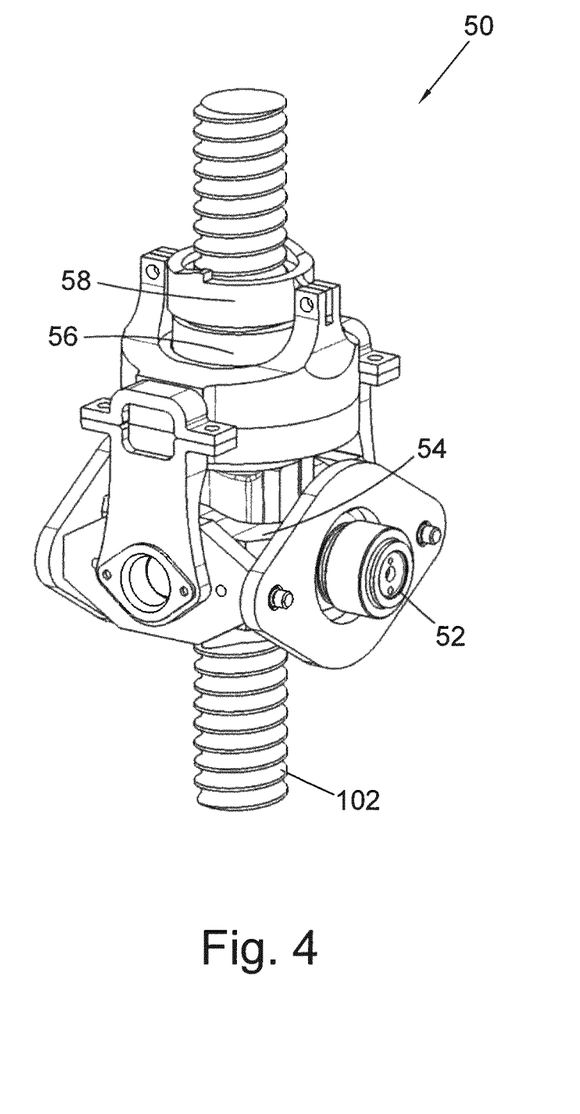
FIG. 4 shows a nut arrangement according to the present disclosure.

FIG. 4 shows a new type of lower attachment 50 according to the present disclosure. The lower attachment assembly 50 of the present disclosure is usable with many parts of the above-described actuator 100, such screw shaft 102, tie rod 208, the ball shaped-end 210 of the tie rod etc. Therefore, where like pieces may be used, like reference numerals will be used too. As described in detail below, the lower attachment 50 according to the present disclosure comprises features that allow for a secondary load path to be unloaded during normal operation, by means of spacing between parts, but that then close the spacing when the secondary load path is engaged. This can reduce flutter of the THS when the secondary load path is engaged in the lower portion of the actuator.

The lower attachment assembly 50 comprises a first attachment means 52 that is fixedly connected to a primary nut 54 (more clearly shown in FIGS. 5, 6A, and 6B) and two secondary nuts 56, 58, hereafter referred to as first secondary nut 56 and second secondary nut 58. The secondary nuts 56, 58 are connected to the first attachment 54 without any gaps/backlash in this connection. That is, in the lower attachment 50 according to the present disclosure, there is no equivalent to the gaps 314,316 of the known lower attachment 300, and instead all of the backlash in the system is "stored" in the secondary nuts 56, 58.

Figure 5:
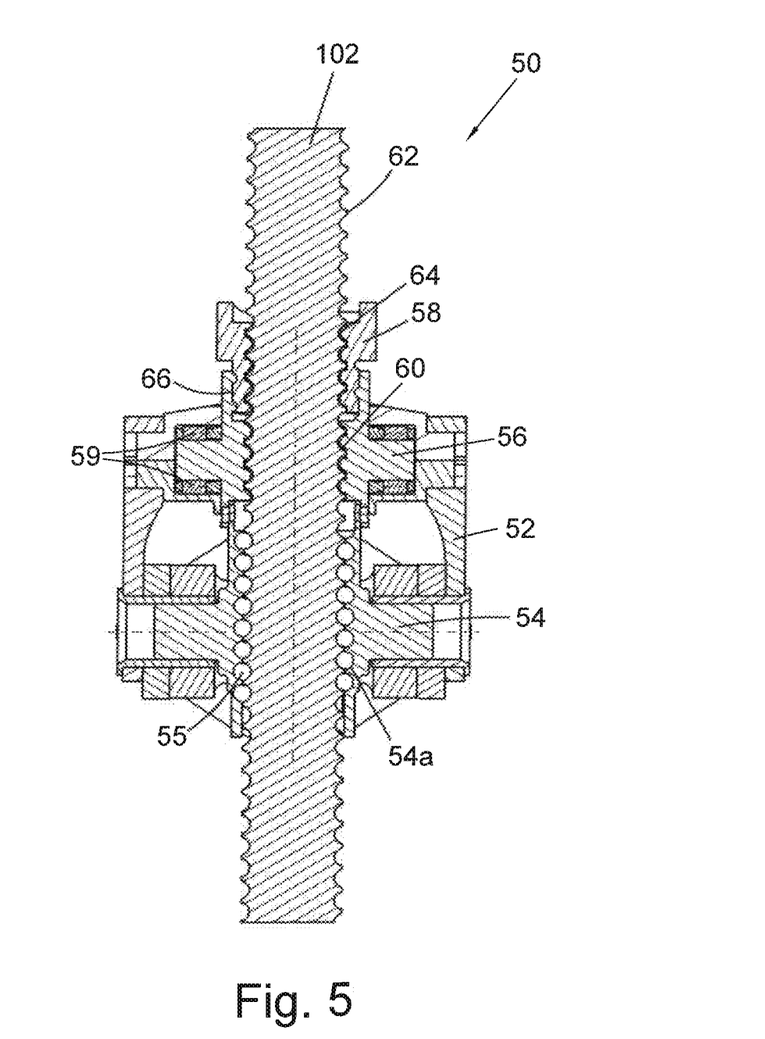
FIG. 5 shows a cross section of the nut arrangement according to the present disclosure.

The screw shaft 102 has a screw thread 62 having a given pitch (the screw shaft thread pitch). The primary nut 54 is a ball-screw nut having balls 55 that engage with both the screw shaft screw thread 62 and a thread 54a of the primary nut 54. During normal operation, loading passes from the screw shaft thread 62, through the balls 55, into the primary nut 54 and thence into the first attachment and to the THS.

During normal operation, the secondary nuts 56, 58 are both held at fixed axial distances relative to the primary nut 54. In this position, the secondary nuts 56, 58 are both held such that their threads 60, 64 are not in contact with the thread 62 of the screw shaft 102.

The first secondary nut 56 is connected to the first attachment 54 via a pair of bearings 59. The bearings 59 allow the first secondary nut 56 to rotate relative to the first attachment 54. As described in detail below, the second secondary nut 58 can move axially (i.e. along the screw shaft 102) relative to the first secondary nut 56. The second secondary nut 58 is connected to the first attachment 54 such that the second secondary nut 58 cannot rotate relative to the first attachment 54.

The first secondary nut 56 is connected to the second secondary nut 58 via a screw thread connection 66. The screw thread connection 66 has a lower pitch compared to the screw shaft thread pitch.

When the primary load path fails, e.g. the primary nut 54 breaks due to wear or fatigue, the secondary nuts 56,58 are loaded (i.e. pressed against the screw shaft thread 62) along the axis of the screw shaft 102, e.g. by aerodynamic forces acting on the THS. As a result of pressing against the screw shaft thread 60, both secondary nuts 56, 58 try to turn relative to the screw shaft 102. The second secondary nut 58 is held against rotation whereas the first secondary nut 56 is not. As a result of the screw thread connection 66 between the secondary nuts 56, 58, the first secondary nut 56 rotates relative to the second secondary nut 58. This changes the relative axial spacing between the two secondary nuts 56, 58 by either pushing the second secondary nut 58 away from the first secondary nut 56, or by pulling the second secondary nut 58 towards the first secondary nut 56. As a result, the screw thread 60 on the first secondary nut 56 will push up against the thread 62 of the screw shaft 102 in a first axial direction (e.g. towards the upper portion 200), while the screw thread 64 on the second secondary nut 58 pushes up against the thread of the screw shaft 102 in a second, opposite, axial direction (e.g. away from the upper portion 200). This changed axial spacing between the secondary nuts 56, 58 thereby takes up the initially-provided backlash that was present when the secondary load path was unloaded. As a result, when the secondary load path is loaded, there is reduced backlash between the secondary nuts 56, 58 and the screw shaft thread 62. The 0.034° certification requirement may thus be met when the SLP is loaded.

To prevent rotation of the first secondary nut 56 while the PLP is engaged, holding means may be provided to limit free rotation of the first secondary nut 56, such as a shear pin or ball-detent (not shown) until a predetermined level of force is applied to rotate the first secondary nut 56 by engagement of the secondary nuts' threads 60, 64 against the screw shaft thread 60.

When the first secondary nut thread 60 is initially loaded against the screw shaft thread 62, the first secondary nut 56 will rotate about the screw shaft 102 and therefore rotate relative to the second secondary nut 58. Due to the lower pitch of the screw thread connection 66 compared to the screw shaft thread 62, the first secondary nut 56 will continue to rotate relative to the second secondary nut 58 until the thread 64 of the second secondary nut 58 firmly abuts the screw thread 62 of the screw shaft 102, on a side opposite to the side on which the thread 60 of the first secondary nut 56 is abutting the screw thread 62 of the screw shaft 102. That is, if the first secondary nut thread 60 abuts the screw thread 62 of the screw shaft 102 on a side of the screw thread that generally faces towards the upper portion 200, then the first secondary nut 56 rotates until the screw thread 64 of the second secondary nut 58 abuts the thread 62 of the screw shaft on a side of the screw thread that generally faces away from the upper portion 200.

When the first secondary nut 56 has rotated relative to the second secondary nut 58 so as to reduce backlash between the secondary nuts 56, 58 and the screw shaft thread 66, a latch mechanism (not shown) may lock the first secondary nut 56 in this new position. The latch mechanism may for example be a hook, a ratchet, or a sprung pin. This ensures that the two secondary nuts 56, 58 maintain their new relative axial positioning even if the direction of loading on the secondary nuts 56, 58 (e.g. from aerodynamic loading on the THS) changes direction.

Figure 6A:
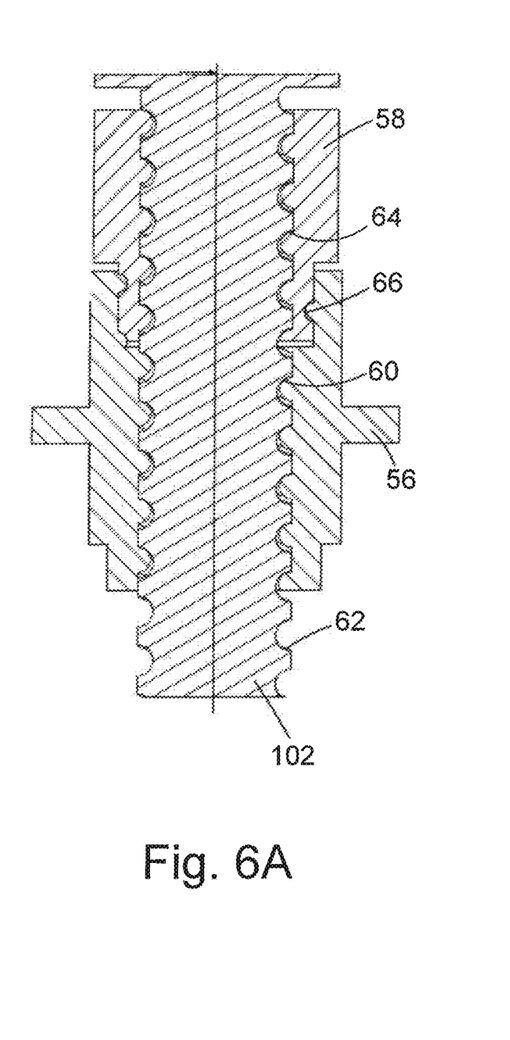
FIGS. 6A and 6B show cross sections of the secondary nuts of the nut arrangement according to the present disclosure.

FIG. 6A shows the two secondary nuts 56, 58 when the first secondary nut 56 is pushed towards the second secondary nut 58 (e.g. under aerodynamic loading on the THS). The first secondary nut 56 rotates relative to the second secondary nut 58 and, as a result of the screw thread connection 66, comes closer thereto. This motion reduces the spacing between the thread 60 of the first secondary nut 56 and the thread 64 of the second secondary nut 58, and thus reduces the backlash between these two threads 60, 64 and the thread 62 of the screw shaft 102.

Figure 6B:
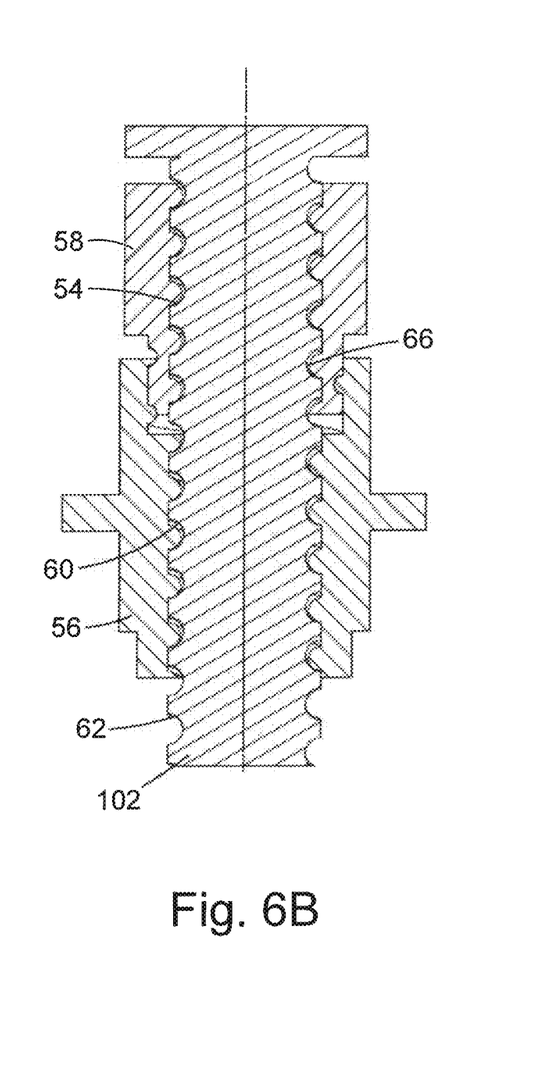

FIG. 6B shows the two secondary nuts 56, 58 when the first secondary nut 56 is pulled in a direction away the second secondary nut 58 (e.g. under aerodynamic loading on the THS). The first secondary nut 56 rotates relative to the second secondary nut 58 and, as a result of the screw thread connection 66, moves further therefrom. This motion increases the spacing between the thread 60 of the first secondary nut 56 and the thread 64 of the second secondary nut 58, and thus reduces the backlash between these two threads 60, 64 and the thread 62 of the screw shaft 102.

While the primary nut 54 is shown in the Figures as a ballscrew nut, it could be a screw nut instead. As the thread pitch of the threads 60,64 of the first and second secondary nuts 56,58 is the same as the thread pitch of the screw shaft 102, the pitch of the threaded connection 60 is lower from the thread pitch of the threads 60,64 of the first and second secondary nuts 56,58.

The shaft and nut arrangements described herein can be manufactured by providing the nut arrangement described above (i.e. comprising a primary nut, a first secondary nut 56 having a first thread 60, a second secondary nut 58 having a second thread 64 and a first attachment means 52). The method further comprises connecting the first nut, first secondary nut, and second secondary nut to the first attachment means with a first, initial, axial spacing between the first and second secondary nuts; and mounting the first secondary nut to the first attachment means via bearings 59 that allow the first secondary nut to rotate relative to the first attachment; and connecting the first secondary nut to the second secondary nut via a screw thread connection 66 having a pitch lower than a pitch of a screw thread 62 of the screw actuator shaft; and wherein, when the primary nut fails under load, the threads 60, 64 of first and second secondary nuts 8, 58 load against the screw thread of the screw shaft 102 which causes the first secondary nut to rotate relative to the second secondary nut and, as a result of the screw thread connection 66, the first and second secondary nuts 56,58 move from the first axial spacing between the first and second secondary nuts to a second, different, axial spacing between the first and second secondary nuts.

What is claimed is:

1. A screw actuator having a screw shaft and a nut arrangement, the nut arrangement comprising:
   a primary nut;
   a first secondary nut having a first thread;
   a second secondary nut having a second thread; and
   a first attachment means;
   wherein the first nut, first secondary nut, and second secondary nut are connected to the first attachment means with a first, initial, axial spacing between the first and second secondary nuts; and
   wherein the first secondary nut is mounted to the first attachment means via bearings that allow the first secondary nut to rotate relative to the first attachment; and
   wherein the first secondary nut is connected to the second secondary nut via a screw thread connection having a pitch lower than a pitch of a screw thread of the screw actuator shaft; and
   wherein, when the primary nut fails under load, the threads of first and second secondary nuts load against the screw thread of the screw shaft which causes the first secondary nut to rotate relative to the second secondary nut and, as a result of the screw thread connection, the first and second secondary nuts move from the first axial spacing between the first and second secondary nuts to a second, different, axial spacing between the first and second secondary nuts.

2. The screw actuator according to claim 1, wherein the primary nut is a ball-screw nut and wherein the first and second secondary nuts are screw nuts.

3. The screw actuator according to claim 1, wherein there is no backlash between the primary nut and the first attachment means, and wherein there is no backlash between the first primary nut and the first attachment means.

4. The screw actuator according to claim 1, wherein the second secondary nut is held against rotation by the first attachment means.

5. A method of reducing backlash in a nut arrangement of a screw actuator, the method comprising:
   mounting the nut arrangement of any preceding claim onto a screw shaft of an actuator, wherein the first and second secondary nuts have a first, initial, axial spacing;
   when the primary nut fails, loading the first and second secondary nuts against a thread of the screw shaft; and
   rotating the first secondary nut relative to the second secondary nut such that, due to the screw connection, the first and second secondary nuts move to a second, different, axial spacing.

6. A method of manufacturing a screw actuator having a screw shaft and a nut arrangement, the method comprising:
   providing a nut arrangement comprising:
   a primary nut;
   a first secondary nut having a first thread;
   a second secondary nut having a second thread; and
   a first attachment means;
   connecting the first nut, first secondary nut, and second secondary nut to the first attachment means with a first, initial, axial spacing between the first and second secondary nuts; and
   mounting the first secondary nut to the first attachment means via bearings that allow the first secondary nut to rotate relative to the first attachment; and
   connecting the first secondary nut to the second secondary nut via a screw thread connection having a pitch lower than a pitch of a screw thread of the screw actuator shaft; and
   wherein, when the primary nut fails under load, the threads of first and second secondary nuts load against the screw thread of the screw shaft which causes the first secondary nut to rotate relative to the second secondary nut and, as a result of the screw thread connection, the first and second secondary nuts move from the first axial spacing between the first and second secondary nuts to a second, different, axial spacing between the first and second secondary nuts.

* * * * *